(12) United States Patent
Kusaka et al.

(10) Patent No.: US 6,933,642 B2
(45) Date of Patent: Aug. 23, 2005

(54) HYDRODYNAMIC GAS BEARING

(75) Inventors: Keigo Kusaka, Akashi (JP); Takafumi Asada, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 265 days.

(21) Appl. No.: 10/164,806

(22) Filed: Jun. 7, 2002

(65) Prior Publication Data

US 2003/0011256 A1 Jan. 16, 2003

(30) Foreign Application Priority Data

Jun. 7, 2001 (JP) ........................................ 2001-171996

(51) Int. Cl.[7] .............................................. H02K 7/08
(52) U.S. Cl. .................................................. 310/90.5
(58) Field of Search .................... 310/90.5, 90, 156.01, 310/156.04, 156.08, 156.12; 384/107, 112, 114, 100; H02K 7/09, 7/08, 33/02; F16C 32/00, 17/10

(56) References Cited

U.S. PATENT DOCUMENTS

| | | | | |
|---|---|---|---|---|
| 5,016,881 A | * | 5/1991 | Lindsey | 463/22 |
| 5,112,141 A | * | 5/1992 | Asada et al. | 384/100 |
| 5,120,139 A | * | 6/1992 | Asada et al. | 384/107 |
| 5,273,368 A | * | 12/1993 | Asada et al. | 384/113 |
| 5,289,067 A | * | 2/1994 | Tanaka et al. | 310/90.5 |
| 6,417,590 B1 | * | 7/2002 | Komura et al. | 310/90.5 |
| 6,604,858 B2 | * | 8/2003 | Kusaka et al. | 384/100 |
| 6,608,415 B2 | * | 8/2003 | Komura et al. | 384/107 |
| 6,678,115 B2 | * | 1/2004 | Khan | 384/107 |

* cited by examiner

Primary Examiner—Burton S. Mullins
Assistant Examiner—Karen Beth Addison
(74) Attorney, Agent, or Firm—Akin Gump Strauss Hauer & Feld, LLP

(57) ABSTRACT

A rotatable hub in which a supporting shaft having hydrodynamic pressure generating grooves is inserted comprises an annular thrust bearing plate in its lower portion and annular permanent magnets in its upper portion. The thrust bearing plate is inserted between the lower end face of the supporting shaft and a thrust flange fixed to the supporting shaft, maintaining the respective clearances D and E.

The permanent magnets on the hub are confronting in such a manner that an upward and downward repulsive forces are generated between permanent magnets mounted on the supporting shaft, respectively maintaining the clearances B and C. Since the clearances B and C are greater than the clearances D and E, the permanent magnets will not mutually contact even when the hub is caused to move upward or downward by an external force during rotation and the thrust bearing plate contacts with the lower end face of the supporting shaft or the thrust flange.

5 Claims, 5 Drawing Sheets

HYDRODYNAMIC GAS BEARING

BACKGROUND OF THE INVENTION

The present invention relates to a non-contact type hydrodynamic gas-bearing in which hydrodynamic pressure is utilized.

For the purpose of increasing data transmission speed of a recording apparatus such as a hard disc apparatus in which a rotating disc is employed, it is required to increase the rotating speed of a motor for driving the disc, so that the disc will rotate at a higher speed. In such a motor designed for high-speed rotation, a non-contact type hydrodynamic gas bearing is employed.

Examples of conventional hydrodynamic gas bearing will be described referring to FIG. 3 and FIG. 4.

FIG. 3 is a cross-sectional view of a hydrodynamic gas bearing according to a first prior art. Referring to FIG. 3, a supporting shaft 12 that is a fixed member is inserted into a bearing bore 13b of a cylindrical hub 13 that is a rotatable member. The supporting shaft 12 is provided with a number of hydrodynamic pressure generating grooves 12b of zigzag pattern formed at regular intervals all over its outer circumferential surface 12a. In FIG. 3, it is to be understood that the illustration of the supporting shaft 12 is actually a schematic side view instead of a sectional view. The schematic side view is for showing that the hydrodynamic pressure generating grooves 12b are formed at regular intervals, rather than exactly showing the supporting shaft 12 seen from a side. The side view of the supporting shaft 12 shows in schematical manner in the manner used in relevant technical field when showing a number of hydrodynamic pressure generating grooves 12b formed at regular intervals on the outer circumferential surface 12a of the supporting shaft 12. Therefore it does not represent the real appearance in draftsmanship. The supporting shaft 12 is provided with a projection 12c on its lower face in the drawing. The projection 12c is fixed to a thrust flange 14a having a flange portion 14. The thrust flange 14a is fixed to a frame 11. On the frame 11, stator 18 is mounted.

The hub 13 is provided with a cylindrical rotor attaching base 13a at its lower portion In the drawing. On the inner wall of the rotor attaching base 13a, a rotor 19 is attached in opposed relationship to the stator 18. On the rotor attaching base 13a, an annular thrust bearing plate 5 is mounted so as to locate between the lower end face 12d of the supporting shaft 12 and the flange portion 14. The upper face 5a and the lower face 5b of the thrust bearing plate 5 are respectively provided with hydrodynamic pressure generating grooves 25a and 25b, as shown in FIG. 5 and FIG. 6. In a static state where the hub 13 is not rotating, the lower face 5b of the thrust bearing plate 5 is in contact with the flange portion 14.

When an electric power is supplied to the stator 18, the rotor 19 generate a rotative force, so that the hub 13 starts to rotate in the direction of an arrow A (clockwise direction when the hub 13 is viewed from an upper direction of the drawing). When the rotating speed of the hub 13 reaches a predetermined value, for example 1000 rpm, air pressure in the clearance between the supporting shaft 12 and the hub 13 increases in the central region 2G of the supporting shaft 12, owing to an air compressing effect by the hydrodynamic pressure generating grooves 12b on the supporting shaft 12. The increase of air pressure allows the hub 13 to rotate without contacting with the supporting shaft 12, maintaining a clearance between the inner wall of the hub 13 and the surface of the supporting shaft 12.

Referring to the thrust bearing plate 5, air pressure increases owing to air compressing effect by the hydrodynamic pressure generating grooves 25a and 25b on the thrust bearing plate 5 between the upper face 5a of the thrust bearing plate 5 and the lower face 12d of the supporting shaft 12 in the vicinity of the projection shaft 12c. In a similar manner, air pressure increases between the lower face 5b of the thrust bearing plate 5 and the upper face 14b of the flange portion 14 in the vicinity of the projection 12c. The increase of air pressure between the upper face 5a of the thrust bearing plate 5 and the lower face 12d of the supporting shaft 12 generates a force to press the hub 13 downward. On the other hand, the increase of air pressure between the lower face 5b of the thrust bearing plate 5 and the upper face 14b of the flange portion 14 will generate a force to press the hub 13 upward. When the rotating speed of the hub 13 reaches a predetermined value and the force to press the hub 13 upward (hereafter referred to as "thrust force") becomes great enough to support the weight of the hub 13, the hub 13 will be lifted. As a result the thrust bearing plate 5 is separated from the flange portion 14 and supported between the lower face 12d of the supporting shaft 12 and the upper face 14b of the flange portion 14 without contacting with either of them. In a state where the hub 13 is supported without a contact, a force to press the hub 13 upward is balanced with a total of the weight of the hub 13 and the force to press the hub 13 downward.

According to the first prior art, since gas is employed which has less viscosity than oil, air pressure between the lower face 5b of the thrust bearing plate 5 and the upper face 14b of the flange portion 14 may not be great enough until the rotating speed of the hub 13 reaches a considerable level. Therefore the thrust bearing plate 5 will rotate in contact with the upper face 14b of the flange portion 14, causing abrasion of the lower face 5b of the thrust bearing plate 5 and the upper face 14b of the flange portion 14 due to friction. Since the friction of the lower face 5b of the thrust bearing plate 5 and the upper face 14b of the flange portion 14 will take place each time the motor is activated, this prior art hydrodynamic gas bearing has a disadvantage that the life span is short due to the abrasion caused by the friction. Besides, fine chips produced from such abrasion are splashed around and stuck to a magnetic disc etc., and would resultantly impair the reliability of the apparatus.

A hydrodynamic gas bearing according to a second prior art, which was developed to solve the foregoing problems, shall now be described referring to a cross-sectional view of FIG. 4. As shown in FIG. 4, the supporting shaft 12 is inserted into the bearing bore 13b of the rotatable cylindrical hub 13. The supporting shaft 12 is provided with hydrodynamic pressure generating grooves 12b formed in zigzags all over its outer circumferential surface 12a The supporting shaft 12 is also provided with a projection 12f on its lower face in the drawing, and the projection 12f is fixed to the frame 11. On the frame 11, the stator 18 is mounted. On the inner wall of the rotor attaching base 13a at the lower portion of the hub 13, the rotor 19 is attached in mutually opposed and rotatable relationship to the stator. The supporting shaft 12 is provided with the other projection 12e on its upper face. An annular permanent magnet 16a is attached to the uppermost end portion of the projection 12e, with an attaching member 17 disposed therebetween. At the base of the projection 12e, an annular permanent magnet 16d is attached on the upper end face of the supporting shaft 12 so as to maintain a predetermined interval from the permanent magnet 16a.

On a flange 13c provided at an upper portion of the hub 13 in the drawing, two annular permanent magnets 16b and 16c are concentrically attached so as to be located between the permanent magnets 16a and 16d. The permanent magnets 16a and 16b are magnetized to mutually generate a repulsive force. Also the permanent magnets 16c and 16d are magnetized to mutually generate a repulsive force.

In the hydrodynamic gas bearing according to the second prior art, the repulsive force between the permanent magnets 16a and 16b as well as that between 16c and 16d are supporting the weight of the hub 13 in the thrust direction (in a vertical direction in the drawing). Therefore the permanent magnets 16a and 16b are not in mutual contact, neither do the permanent magnets 16c and 16d, even while the hub 13 is not rotating. However, in case where a shaking force in the thrust direction is imposed to the hub 13 due to an external force, the hub 13 may largely move in the thrust direction, thus causing the permanent magnets 16a and 16b, or the permanent magnets 16c and 16d, to make mutual contacts. Due to such contacts that may occur while the hub 13 is rotating, permanent magnets that are relatively brittle may chip at a contact point or even break depending on the extent of impact.

BRIEF SUMMARY OF THE INVENTION

An object of the present invention is to provide a hydrodynamic gas bearing having greater reliability by minimizing friction of a rotating component and a fixed component in the hydrodynamic gas bearing.

A hydrodynamic gas bearing according to the present invention comprises a rotatable cylindrical hub with an internal circumferential face of a circular cross-section, and a supporting shaft inserted in the cylindrical hub maintaining a predetermined clearance from the internal circumferential face, to rotatably support the hub. The hub is provided with an annular thrust bearing plate disposed in opposed relationship to one end face of the supporting shaft, for generating a supporting force to support the hub in an axial direction of the supporting shaft when the hub rotates in a predetermined direction. A thrust flange having a flange portion confronting the annular thrust bearing plate is fixed to a projection which is projected from the end face of the supporting shaft through a hole provided in the thrust bearing plate. An end portion of the projection is fixed to a fixing frame, and a rotation driving unit for supplying a rotative force to the hub is mounted on the fixing frame. The supporting shaft is provided with at least one first permanent magnet and the hub is provided with at least one second permanent magnet disposed in opposed relationship to the first permanent magnet and magnetized so as to generate a repulsive force against the first permanent magnet. The clearance between the first permanent magnet and the second permanent magnet becomes greater than the clearance between the thrust bearing plate and the thrust flange.

According to the present invention, the clearance between the first permanent magnet and the second permanent magnet is greater than the clearance between the thrust bearing plate and the thrust flange. Therefore, the first permanent magnet will not contact with the second permanent magnet even if the thrust bearing plate on the hub contacts with the thrust flange due to shaking caused by an external force, when the hub starts to rotate or when the hub is about to stop rotating, or while the hub is rotating. As a result, a damage to brittle permanent magnets can be prevented.

DETAILED DESCRIPTION OF THE INVENTION

Figure 1:
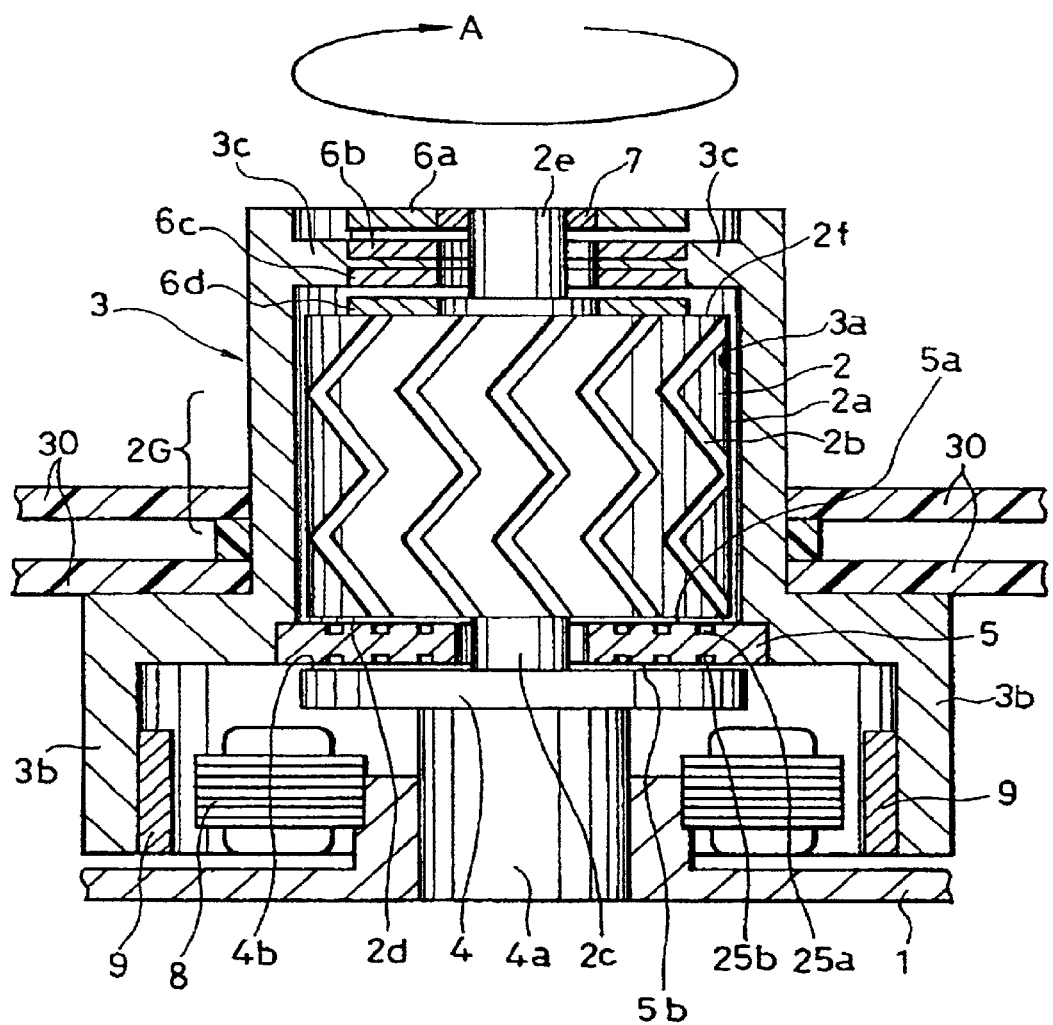
FIG. 1 is a cross-sectional view of a hydrodynamic gas bearing according to the embodiment of the present invention.
Figure 2:
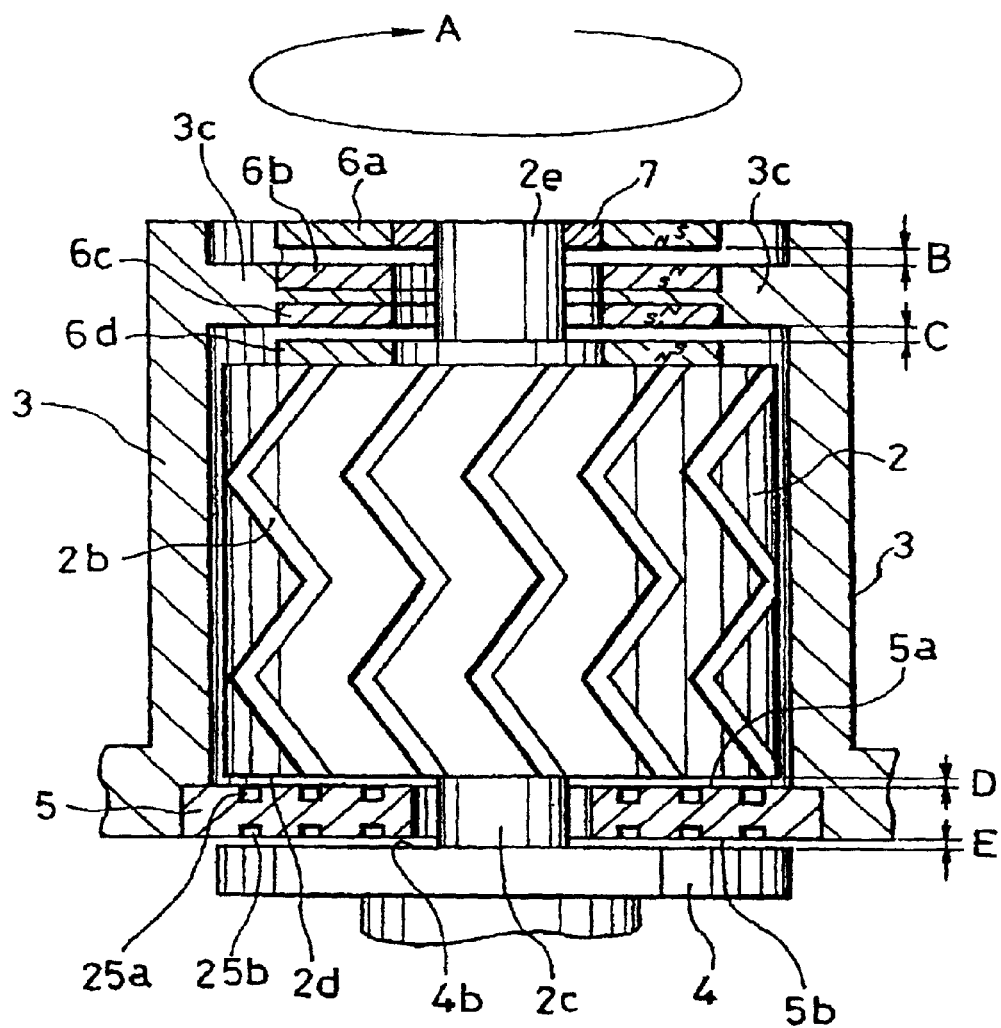
FIG. 2 is an enlarged fragmentary view of FIG. 1.
Figure 3:
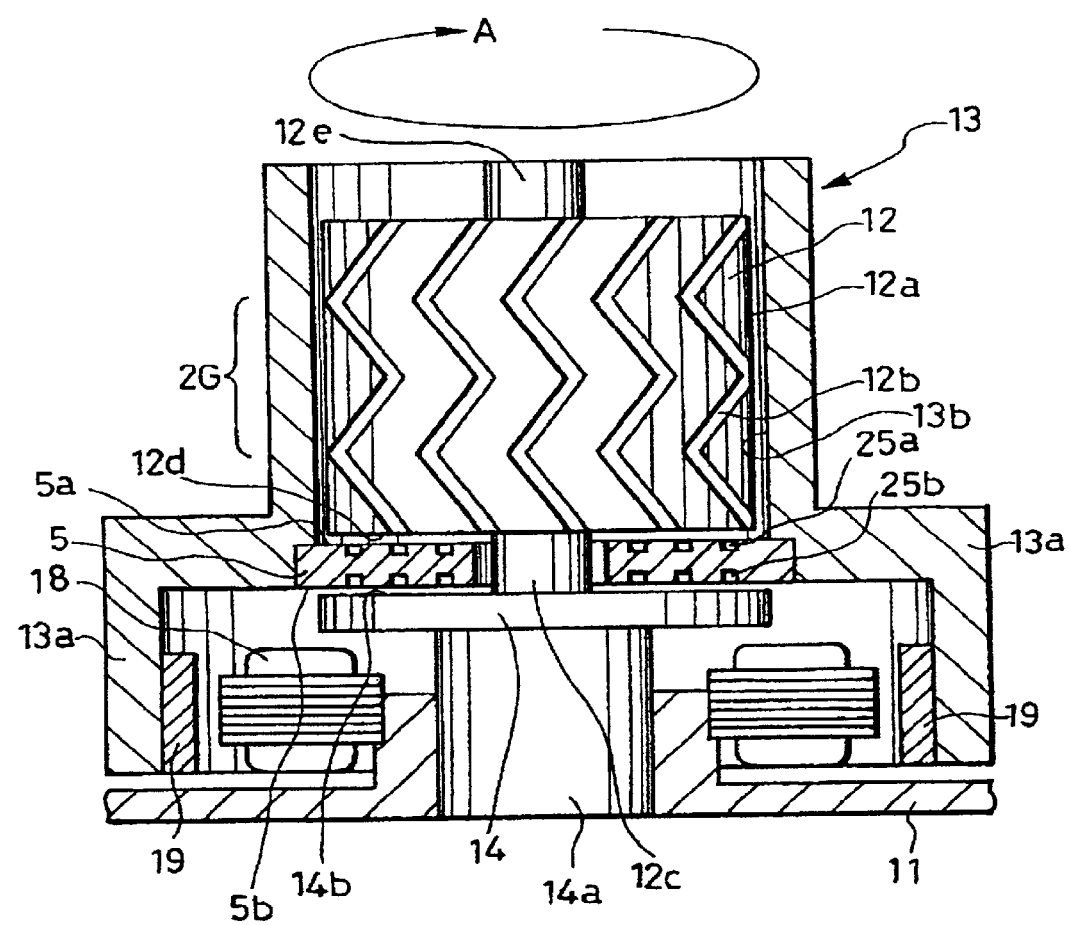
FIG. 3 is the cross-sectional view of the hydrodynamic gas bearing according to the first prior art.
Figure 4:
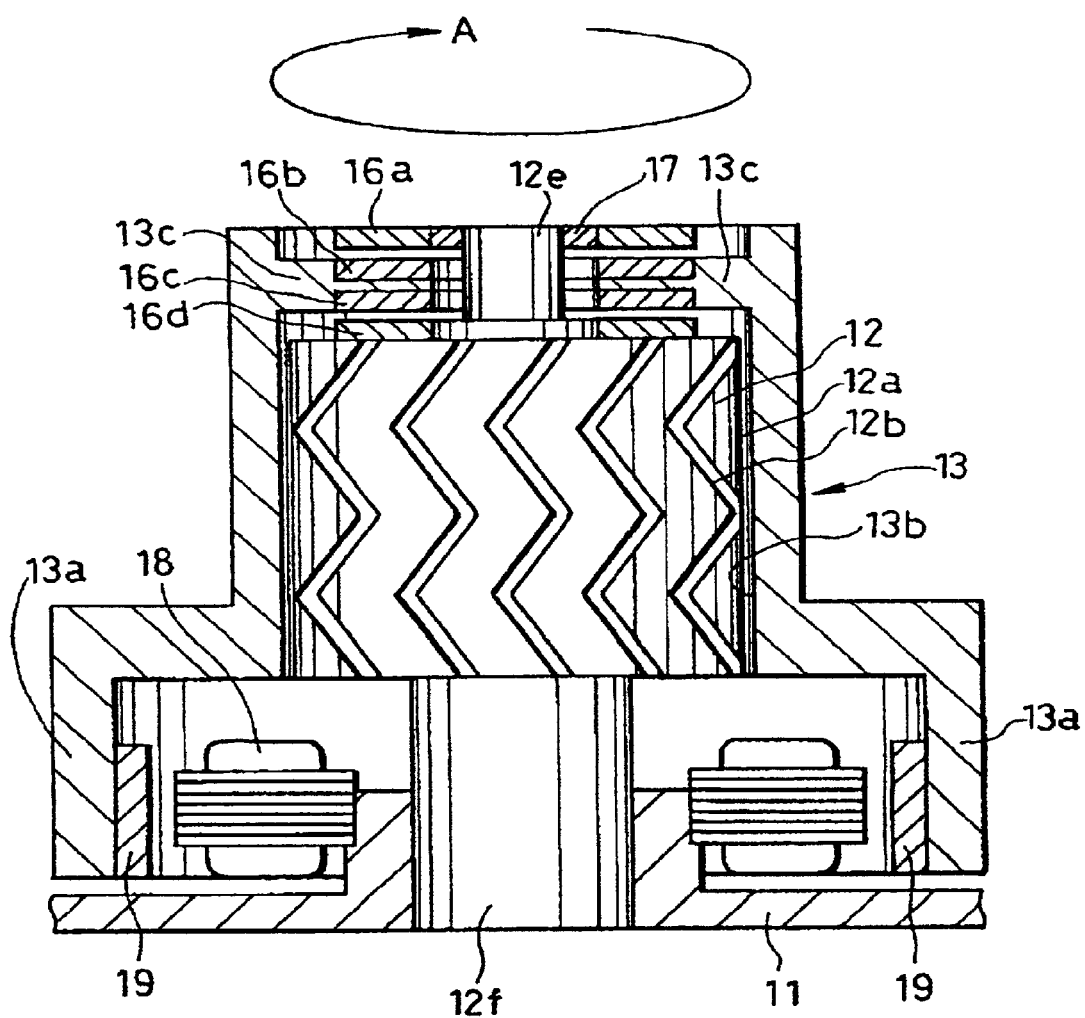
FIG. 4 is the cross-sectional view of the hydrodynamic gas bearing according to the second prior art.

A preferred embodiment of a hydrodynamic gas bearing according to the present invention will be described referring to FIG. 1 and FIG. 2. FIG. 1 is a cross-sectional view of the hydrodynamic gas bearing in accordance with the embodiment. FIG. 2 is an enlarged fragmentary view of the hydrodynamic gas bearing in FIG. 1.

Referring to FIG. 1, a supporting shaft 2 is inserted into a bearing bore 3a of a cylindrical hub 3 which is a rotatable member with a circular internal circumferential face. Rotating members, for example magnetic discs 30 that are partially illustrated, to be supported by the hydrodynamic gas bearing in accordance with this embodiment are mounted on the hub 3. The supporting shaft 2 that is a fixed member is provided with a number of hydrodynamic pressure generating grooves 2b formed in zigzags at regular intervals all over its outer circumferential face 2a. In FIG. 1, it is to be understood that the illustration of the supporting shaft 2 is a side view instead of a cross-sectional view, and therefore the hydrodynamic pressure generating grooves 2b at regular intervals do not actually look like the drawing when the supporting shaft 2 is viewed from a side. Also, the side view of the supporting shaft 2 serves only for showing that in the relevant technical field a number of hydrodynamic pressure generating grooves 2b are formed at regular intervals on the outer circumferential face 2a of the supporting shaft 2, and therefore does not represent the real side view. In other words, the appearance of the hydrodynamic pressure generating grooves 2b on the supporting shaft 2 viewed from a side is different from the drawing in FIG. 1. According to FIG. 1 the hydrodynamic pressure generating grooves 2b are formed on the outer circumferential face 2a of the supporting shaft 2, while it is also preferable to form the hydrodynamic pressure generating grooves on the inner wall of the hub 3. The supporting shaft 2 is provided with a projection 2c on its lower face in the drawing. The projection 2c is fixed to a thrust flange 4a having a flange portion 4. The thrust flange 4a is fixed to a frame 1. Stator 8 to serve as a rotation driving unit is mounted on the frame 1.

Figure 5:
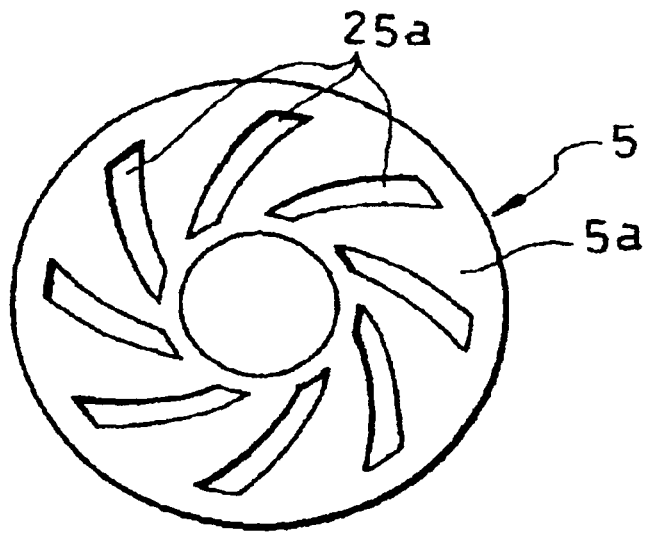
FIG. 5 is the plan view of the upper surface 5a of thrust bearing plate 5 of FIG. 3.
Figure 6:
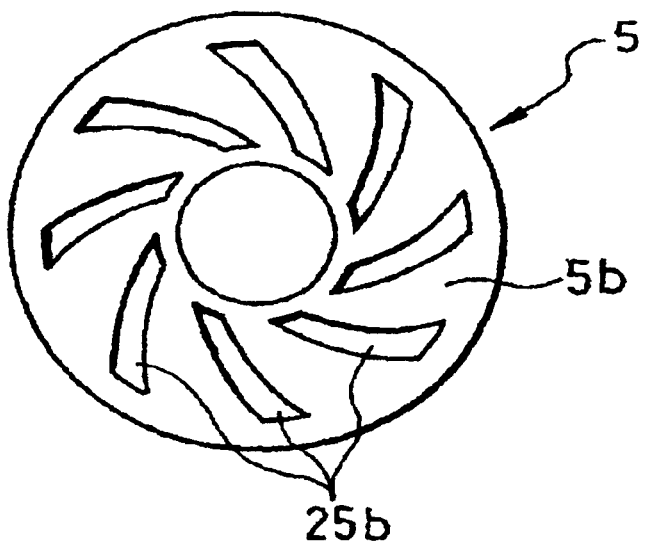
FIG. 6 is the plan view of the lower surface 5b of thrust bearing plate 5 of FIG. 3.

The hub 3 is provided with a cylindrical rotor attaching base 3b at its lower portion in the drawing. On the inner wall of the rotor attaching base 3b, rotor 9 which is driven members are mounted in opposed relationship to the stator 8. On the rotor attaching base 3b, an annular thrust bearing plate 5 is attached so as to locate between the lower end face 2d of the supporting shaft 2 and the upper face 4b of the flange portion 4. The upper face 5a and the lower face 5b of the thrust bearing plate 5 are respectively provided with hydrodynamic pressure generating grooves 25a and 25b of the same configuration as the conventional ones shown in FIG. 5 and FIG. 6. The supporting shaft 2 is provided with the other projection 2e on its upper face, An annular permanent magnet 6a is attached to the uppermost end of the projection 2e, with an attaching member 7 disposed therebetween. At the base of the projection 2e, an annular permanent magnet 6d is attached on the upper end face of the supporting shaft 2 which is for maintaining a predetermined interval from the permanent magnet 6a.

The hub 3 is provided with a flange 3c at its upper portion in the drawing. To the flange 3c, two annular permanent magnets 6b and 6c are concentrically attached so as to be disposed between the permanent magnets 6a and 6d. The permanent magnets 6a and 6d are magnetized to have an S-pole on their upper face and an N-pole on their lower face. The permanent magnets 6b and 6c are magnetized to have an N-pole on their upper face and an S-pole on their lower face. As a result, the permanent magnets 6a and 6b repel each other. Likewise, the permanent magnets 6c and 6d repel each other. The repulsive force generated between the permanent magnets 6a and 6b will press the hub 3 downward. Meanwhile the repulsive force generated between the permanent magnets 6c and 6d press the hub 3 upward. Magnetic force of the respective permanent magnets 6a, 6b, 6c and 6d is adjusted so that the resultant force composed of the repulsive force between the permanent magnets 6a and 6b and between the permanent magnets 6c and 6d apply an upward force to the hub 3. However such upward force is made smaller than the gravity of the hub 3. Therefore, where the hub 3 is not rotating, the lower face 5b of the thrust bearing plate 5 is in contact with the upper face 4b of the flange portion 4. It is preferable to adjust magnetic forces of the respective permanent magnets 6a, 6b, 6c and 6d, so that 50% or more of the gravity of the hub 3 or about 80% thereof in accordance with the structure of a bearing is offset by the upward force provided by the resultant force composed of the repulsive force between the permanent magnets 6a and 6b and between the permanent magnets 6c and 6d.

FIG. 2 is an enlarged cross-sectional view of a relevant part of the hydrodynamic gas bearing of FIG. 1. Referring to FIG. 2, the clearance between the permanent magnets 6a and 6b is denoted as B, and the clearance between the permanent magnets 6c and 6d in denoted as C. Further, the clearance between the lower face 2d of the supporting shaft 2 and the upper face 5a of the thrust bearing plate 5 is denoted as D, and the clearance between the lower face 5b of the thrust bearing plate 5 and the upper face 4b of the flange portion 4 is denoted as E. In the hydrodynamic gas bearing according to this embodiment, the clearance D is set smaller than the clearance B (D<B). Likewise the clearance E is set smaller than the clearance C (E<C).

In the hydrodynamic gas bearing of FIG. 1, when electric power is supplied to the stator 8, the rotor 9 generates a rotative force, so that the hub 3 starts to rotate in the direction of the arrow A. The rotating direction shown by the arrow A is clockwise when the hydrodynamic gas bearing is viewed from an upper direction. In the hydrodynamic gas bearing according to this embodiment, since a substantial part of the downward gravity of the hub 3 is offset by the upward force provided by the resultant force composed of the repulsive force between the permanent magnets 6a and 6b and between the permanent magnets 6c and 6d, the apparent gravity of the hub 3 is smaller than it actually is. Therefore even while the rotating speed of the hub 3 is still relatively low, for example 5% of the rated rotation speed, a force in an upward direction (hereafter referred to as thrust directions) applied to the thrust bearing plate 5 exceeds the apparent gravity of the hub 3 due to increase of air pressure between the lower face 5b of the thrust bearing plate 5 and the upper face 4b of the flange portion 4. As a result, the hub 3 is lifted in the thrust direction, making the lower face 5b of the thrust bearing plate 5 and the upper face 4b of the flange portion 4 non-contacting. Accordingly the non-contact state is attained in a short time period from starting the rotation. In other words friction between the lower face 5b of the thrust bearing plate 5 and the upper face 4b of the flange portion 4 takes place only for a short time, therefore abrasion at the time of starting is greatly reduced, resulting in a prolonged life span of the hydrodynamic gas bearing. Since the reduction of abrasion leads to the decrease of issue of fine chips due to abrasion, the reliability of a disc apparatus or the like is improved by using the hydrodynamic gas bearing according to this embodiment. The rotation of the hub 3 will also increase air pressure between the upper face 5a of the thrust bearing plate 5 and the lower face 2d of the supporting shaft 2, therefore a downward force is applied to the thrust bearing plate 5. As a result the thrust bearing plate 5 rotates between the lower face 2d of the supporting shaft 2 and the upper face 4b of the flange portion 4, thereby eliminating contact between them. When the rotating speed of the hub 3 exceeds a predetermined value, air pressure between the outer circumferential face of the supporting shaft 2 and the inner wall of the hub 3 increases in the central region 2G of the supporting shaft 2, due to an air compressing effect by the hydrodynamic pressure generating grooves 2b on the supporting shaft 2. The increase of air pressure allows the hub 3 to rotate without contact with the supporting shaft 2, thereby maintaining a clearance between the inner wall of the hub 3 and the outer surface of the supporting shaft 2.

In case where an external shaking force is imposed on the hydrodynamic gas bearing while the hub 3 is rotating and a force is applied to the hub 3 in the thrust direction, the hub 3 may move in the thrust direction. If the hub 3 moves in the thrust direction, the thrust bearing plate 5 may contact with the lower face 2d of the supporting shaft 2 or the upper face 4b of the flange portion 4. However according to this embodiment, since the clearances D and E are smaller than the clearances B and C, respectively, as shown in FIG. 2, the permanent magnet 6b or 6c does not contact with the permanent magnet 6a or 6d respectively, even if the thrust bearing plate 5 contacts with the lower face 2d of the supporting shaft 2 or the upper face 4b of the flange portion 4. Consequently, the permanent magnets are damaged though relatively brittle permanent magnets are used.

What is claimed is:

1. A hydrodynamic gas bearing comprising:
   a rotatable cylindrical hub with an internal circumferential face of a circular cross-section;
   a supporting shaft inserted in said cylindrical hub for maintaining a predetermined clearance form said internal circumferential face, to rotatably support said hub to allow its rotation;
   an annular thrust bearing plate attached to said hub in opposed spaced relationship to an end face of said supporting shaft, for generating a supporting force to support said hub in an axial direction of said supporting shaft when said hub rotates in a predetermined direction;
   a projection which is projected from said end face of said supporting shaft through a hole in said annular thrust bearing plate;
   a thrust flange fixed to said projection and having a flange portion opposing to and spaced from said thrust bearing plate;
   a fixing frame on which said thrust flange is mounted;
   a rotation driving unit mounted on said fixing frame for supplying a rotative force to a member to be driven attached to said hub;

at least one first permanent magnet attached to said supporting shaft, said first permanent magnet including a third permanent magnet and a fourth permanent magnet each of which have magnet poles in the axis direction of said supporting shaft and are mounted on an end portion of said supporting shaft in spaced relation to each other; and at least one second permanent magnet attached to said hub in opposed spaced relationship to said first permanent magnet and magnetized so as to generate a repulsive force against said first permanent magnet, said second permanent magnet including a fifth permanent magnet which is mounted on said hub in opposed spaced relationship to said third permanent magnet and has magnetic poles in a direction so as to separate a repulsive force against said third permanent magnet, and a sixth permanent magnet which is mounted on said hub in opposed spaced relationship to said fourth permanent magnet and has magnetic poles in a direction so as to generate a repulsive force against said fourth permanent magnet; wherein the space between said third permanent magnet and said fifth permanent magnet is larger than the space between said one end face of said supporting shaft and said thrust bearing plate, and the space between said fourth permanent magnet and said sixth permanent magnet is larger than the space between said thrust bearing plate and said flange.

2. The hydrodynamic gas bearing in accordance with claim 1, wherein at least one of said internal circumferential face of said hub or outer circumferential face of said supporting shaft has hydrodynamic pressure generating grooves for supporting said hub in a radial direction thereof.

3. The hydrodynamic gas bearing in accordance with claim 1, wherein at least either of one end face of said supporting shaft or a surface of said thrust bearing plate confronting said end face of said supporting shaft has hydrodynamic pressure generating grooves for generating a supporting force in an axial direction of said supporting shaft.

4. The hydrodynamic gas bearing in accordance with claim 1, wherein at least either of the respective confronting surfaces of said thrust bearing plate and said flange portion has hydrodynamic pressure generating grooves for generating a supporting force an axial direction of said supporting shaft.

5. The hydrodynamic gas bearing in accordance with claim 1, wherein said third and fourth permanent magnets are attached to said end portion of said supporting shaft with a predetermined clearance between each other and having a magnetic pole in an axial direction of said supporting shaft and said fifth and sixth permanent magnets are attached to said hub so as to respectively confront said third and fourth permanent magnets and having a magnetic pole that generate a repulsive force against said third and fourth permanent magnets, wherein the respective clearances between said third and fourth permanent magnets and said fifth and sixth permanent magnets are greater than a clearance between said end face of said supporting shaft and said thrust bearing plate and said clearance between said thrust bearing plate and said flange portion.

* * * * *